(12) United States Patent
Whitlock et al.

(10) Patent No.: US 10,619,998 B2
(45) Date of Patent: Apr. 14, 2020

(54) METHOD OF MEASURING CLEARANCE BETWEEN ROTATING AND STATIC COMPONENTS

(71) Applicant: Rolls-Royce Corporation, Indianapolis, IN (US)

(72) Inventors: Mark Whitlock, Zionsville, IN (US); Jonathan Acker, Westfield, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 406 days.

(21) Appl. No.: 15/165,153

(22) Filed: May 26, 2016

(65) Prior Publication Data

US 2017/0343334 A1 Nov. 30, 2017

(51) Int. Cl.
*G01B 11/14* (2006.01)

(52) U.S. Cl.
CPC .................... *G01B 11/14* (2013.01)

(58) Field of Classification Search
None
See application file for complete search history.

(56) References Cited

U.S. PATENT DOCUMENTS

| | | | | |
|---|---|---|---|---|
| 3,583,824 A * | 6/1971 | Smuland | ................ | F01D 11/18 415/117 |
| 4,074,742 A * | 2/1978 | Chamblin | ................ | B60C 11/24 152/154.2 |
| 4,980,763 A * | 12/1990 | Lia | ................ | G01B 11/02 348/137 |
| 5,649,369 A | 7/1997 | Thoren | | |
| 5,760,593 A * | 6/1998 | Lawrence | ................ | G01B 7/14 250/559.31 |
| 6,575,011 B1 * | 6/2003 | Busby | ................ | G01N 3/56 73/7 |
| 6,626,635 B1 * | 9/2003 | Prowse | ................ | F01D 11/18 415/1 |
| 8,622,016 B2 * | 1/2014 | Wiebe | ................ | F16D 66/02 116/208 |
| 8,684,669 B2 * | 4/2014 | Chehab | ................ | F01D 11/122 415/118 |
| 8,864,446 B2 * | 10/2014 | Singh | ................ | F01D 11/001 116/208 |
| 2003/0020496 A1 * | 1/2003 | Eyraud | ................ | F01D 11/122 324/699 |

(Continued)

FOREIGN PATENT DOCUMENTS

EP 2236977 A1 10/2010

*Primary Examiner* — Kara E. Geisel
*Assistant Examiner* — Jarreas C Underwood
(74) *Attorney, Agent, or Firm* — Duane Morris LLP; Patrick Craig Muldoon (57) ABSTRACT

A method of measuring the clearance between a rotating component and a static component in a rotating machine. The method comprises installing a rub pin on an interior surface of the static component, operating the rotating machine such that the rotating component impinges on the rub pin, securing the rotating machine, and inserting an optical device to visually ascertain the length of rub pin remaining. The method reduces the time and cost of clearance determinations by avoiding disassembly or the degree of disassembly of the rotating machine required to conduct a clearance determination.

18 Claims, 5 Drawing Sheets

(56) References Cited

U.S. PATENT DOCUMENTS

| | | | |
|---|---|---|---|
| 2006/0129301 A1* | 6/2006 | Ashby | F02C 9/28 |
| | | | 701/100 |
| 2008/0267769 A1* | 10/2008 | Schwarz | F01D 11/20 |
| | | | 415/148 |
| 2010/0242293 A1* | 9/2010 | Willett | G01B 7/14 |
| | | | 33/501 |
| 2010/0303612 A1* | 12/2010 | Bhatnagar | F01D 11/22 |
| | | | 415/127 |
| 2012/0207586 A1 | 8/2012 | Chehab et al. | |
| 2015/0075265 A1 | 3/2015 | Memmer et al. | |
| 2015/0252686 A1* | 9/2015 | Wasserman | F01D 21/003 |
| | | | 416/1 |

* cited by examiner

METHOD OF MEASURING CLEARANCE BETWEEN ROTATING AND STATIC COMPONENTS

FIELD OF THE DISCLOSURE

The present disclosure relates generally to methods of measurement, and more specifically to method of measuring clearance between rotating and static components in a machine such as a turbine machine.

BACKGROUND

In a machine with rotating components it is often desirable to measure the distance between a rotating component and nearby static components of the machine. This distance, referred to as the clearance, is necessarily kept larger than a minimum clearance requirement such that the rotating component does not strike the static component during operation of the machine. However, relatively large clearances in rotating machines are also undesirable as they can reduce the efficiency of the machine.

As an example, in a turbine engine such as a gas turbine engine the blades of the turbomachinery rotate at high rates of speed relative to a static casing or shroud that houses the rotor. The gas turbine engine may comprise a compressor, a combustor, and a turbine. From a cold start to operating temperatures the various rotating and static components may undergo thermal expansion. It is therefore desirable that even at full operating temperatures a sufficient clearance is maintained. A sufficient clearance ensures that a rotating rotor blade does not strike the casing. However, in the case of a turbine engine, clearances larger than that sufficient to prevent blade impingement allow a flowpath for combustion gases to bypass the turbomachinery such as compressor blades or turbine blades, thus reducing the efficiency of the turbine engine. The measurement of clearances is additionally beneficial when conducting performance diagnostics on turbomachinery.

Understanding then that clearances are critical to the safe and efficient operation of rotating machines, it is desirable to be able to measure them. Unfortunately, in many rotating machines, access to the space between a rotating component and static component is extremely restricted. In many machines, accessing this space requires removal of at least a portion of the casing or shroud around the rotating component, which is typically a difficult, time-consuming, and expensive process. Additionally, as noted above there can be significant changes in clearances depending on whether a machine is at cold or operating temperatures. As it is generally not practicable to directly measure a clearance in an operating machine, it is necessary to have a method of measurement during operations that does not imperil the safe operation of the machine.

Previous solutions to this problem include the use of rub pins. Rub pins are typically columnar shaped and formed from a soft metal or similar material which can be abraded when contacted by a rotating component during operation. A rub pin is affixed to a static component such that it is disposed in the space between a rotating component and the static component, and the machine is then started and brought to operating temperatures or pressures. Once the machine has been operated in a desired manner or for a desired length of time, the machine is secured and cooled down. The machine is then at least partially disassembled to allow for inspection and retrieval of the rub pin. Due to the impingement of a rotating blade on the pin, the pin will have worn down to indicate the clearance between the rotating component and static component. A measurement of the pin length, when measured between the worn end and the surface of the static component, is a measurement of the machine's clearance. Although effective at obtaining accurate clearance measurements, the use of rub pins is a time-consuming and expensive process because it requires securing and partially disassembling the machine to insert the pins, operating the machine, and then securing and partially disassembling the machine a second time to retrieve and inspect the pins.

Another solution is described in European Patent Application 2,236,977. This application discloses a rub pin having at least one embedded wire which completes a circuit through the pin. When the pin is installed in the static component and protrudes into the rotating component path, the wire will be broken by blade impingement at a certain clearance. Breaking the wire causes an interruption in the circuit, which can be used as an indication that the clearance is insufficient or has surpassed a predetermined measurement. This solution is thus effective at monitoring machine performance for a single clearance, but does not provide a means for measuring over a wide range of clearances and additionally requires electrical circuitry for effective use.

It is thus desired for an improvement in the art of measuring clearances which would enable such measurements to be taken in a safe and efficient manner.

The present application discloses one or more of the features recited in the appended claims and/or the following features which, alone or in any combination, may comprise patentable subject matter.

SUMMARY

According to an aspect of the present disclosure, a method of measuring clearance between a rotating component and a static component in turbomachinery without twice disassembling the static component comprises: disassembling, at least partly, the static component to position at least one rub pin in the static component, wherein the at least one rub pin has interval markings and is disposed having a proximal end of the rub pin extending toward the rotational path of the rotating component; operating the turbomachinery to achieve at least one steady-state operating parameter, said operating causing the rotating component to remove a portion of the rub pin; inserting an optical device into the static component without disassembly; and visually ascertaining, via the optical device, the number of interval markings between an interior surface of the static component and a terminal end of the rub pin formed by the removal of the a portion of the rub pin in the rotational path of the rotating component.

In some embodiments the clearance is determined for steady-state operating parameters temperature, pressure, rotational speed of the rotatable component, or output of the turbomachinery.

According to an aspect of the present disclosure, an optical rub pin comprises a base adapted to be received and affixed to a stationary component of a turbomachine; an elongated portion extending from the base and adapted to project radially inward from the stationary component; the elongated portion comprising a plurality of visual indicators, each representing a predetermined interval; wherein the plurality of visual indicators are adapted to be worn away by contact with a rotating component of a turbomachine.

In some embodiments the plurality of visual indicators are distinguished from adjacent ones of the plurality of visual indicators by a characteristic selected from the group consisting of texture, color and text. In some embodiments the plurality of visual indicators are notches or engravings defining the predetermined intervals. In some embodiments the predetermined intervals are constant. In some embodiments the predetermined intervals are approximately 0.002 inches. In some embodiments the characteristics of plurality of visual indicators alternates to more easily distinguish between adjacent intervals. In some embodiments the characteristic is unique to one of the plurality of visual indicators. In some embodiments the plurality of visual indicators comprise a coating over the elongated portion. In some embodiments the plurality of visual indicators are bands surrounding a central rod. In some embodiments the plurality of visual indicators are a core within a bore in the elongated portion. In some embodiments the plurality of visual indicators are arranged sequentially along a longitudinal axis of the elongated portion. In some embodiments the color of each of the plurality of visual indicators is associated with a predetermined distance. In some embodiments the plurality of visual indicators comprises a clearance visual indicator, the clearance visual indicators forming the terminal portion of the elongated portion most distant from the base.

According to another aspect of the present disclosure, a method of determining the clearance between a blade and shroud of a turbomachine comprises inserting an optical device through a port in the turbomachine; visually ascertaining, via observing with the optical device, a characteristic of one or more of a plurality of visual indicator on an optical rub pin, wherein the optical rub pin comprises a base adapted to be received and affixed to an interior of the shroud; an elongated portion extending from the base and adapted to project radially inward from the shroud, wherein the plurality of visual indicators comprise at least a portion of the elongated portion; determining the clearance based on the ascertained characteristic on a terminus of the optical rub pin.

In some embodiments the characteristic is selected from the group consisting of color, texture, contour and text. In some embodiments the characteristic alternates between adjacent visual indicators. In some embodiments the plurality of visual indicators define a plurality of intervals. In some embodiments the plurality of visual indicators are notches or engravings defining the predetermined intervals.

BRIEF DESCRIPTION OF THE DRAWINGS

The following will be apparent from elements of the figures, which are provided for illustrative purposes and are not necessarily to scale.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

This disclosure presents embodiments to overcome the aforementioned deficiencies in clearance measuring systems and methods. More specifically, the present disclosure is directed to systems and method of measuring clearances between a rotating component and static component which limits or eliminates the disassembly of the machine required to effectively measure the clearance. Limiting machine disassembly reduces the time and cost associated with measuring the clearance.

Figure 1A:
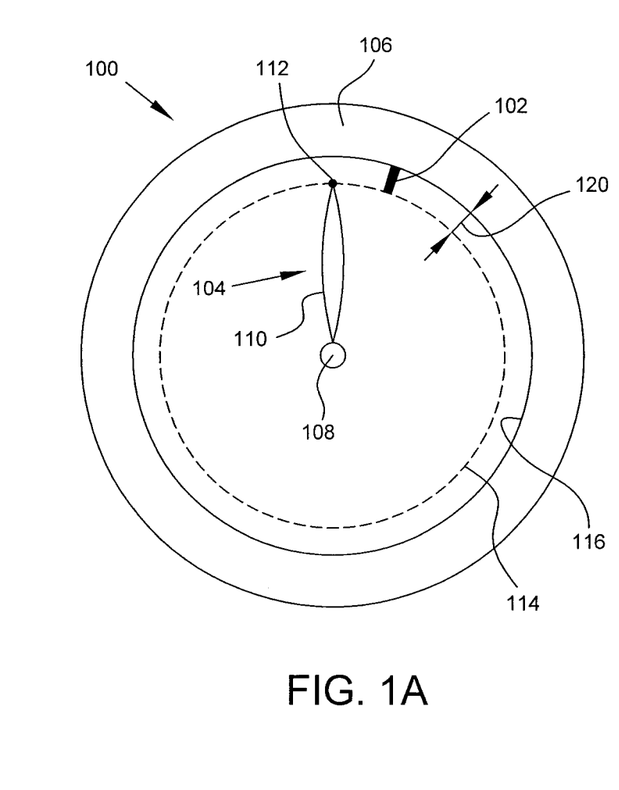
FIG. 1A is a schematic profile view of a rotating machine with installed rub pin in accordance with some embodiments of the present disclosure.

FIG. 1A is a schematic profile view of a rotating machine 100 with installed rub pin 102 in accordance with some embodiments of the present disclosure. Rotating machine 100 comprises a rotating component 104 and static component 106. In the illustrated embodiment, rotating component 104 is a compressor having a shaft 108 and plurality of blades 110 coupled thereto. For simplicity of the illustration, only a single compressor blade 110 is shown. Although the illustrated rotating component 104 is a compressor, the present disclosure is equally applicable to other rotating components 104 such as fans and turbines.

Static component 106 is illustrated as a casing, such as a compressor engine casing. In some embodiments static component 106 is a shroud, mount, engine block, or similar structure. Static component 106 may also be referred to as a stationary component.

Each blade 110 of the rotating component has a tip 112 at the radially-outward end of the blade 110. This furthest extension of the blade 110 defines the travel path 114 of the rotating component 104. The distance between the travel path 114 and the radially inner surface 116 of static component 106 is the clearance 120. During operation of rotating machine 100, the diameter of travel path 114 is susceptible to change. Travel path 114 is illustrated in FIG. 1A in a cold, non-operating condition of the rotating machine 100. As many rotating machines 100 typically operate at relatively high temperatures, the rotating component 104 is likely to undergo thermal expansion during operation that results in an expanded travel path 114 and thus in a reduced clearance 120. Additional operational transients such as changes in power demand or operating pressures of the rotating machine 100 will cause changes in the travel path 114.

FIG. 1A illustrates a rub pin 102 disposed in rotating machine 100. Rub pin 102 is installed in rotating machine 100 by affixation to static component 106. In some embodiments rub pin 102 is affixed to static component 106 by insertion into predefined grooves or bores, or by adhesive, or a combination.

Rub pin 102 is installed in rotating machine 100 such that a distal end 123 is affixed to or inserted into static component 106 and a proximal end 125 extends toward the rotational path of blade 110. In some embodiments rub pin 102 is aligned with a radius of shaft 108. In some embodiments, the proximal end 125 of rub pin 102 extends into the rotational path of blade 110. The rotational path of blade 110 is defined by the travel path 114 of rotating component 104.

Figure 1B:
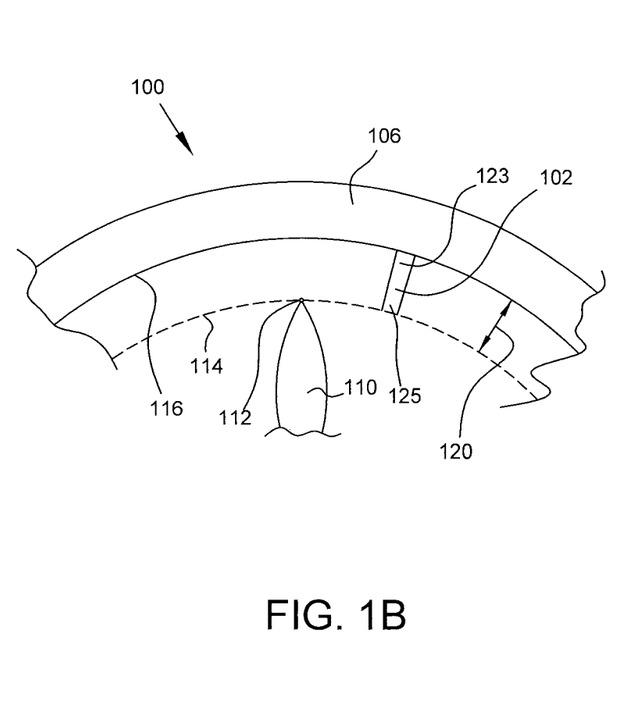
FIG. 1B is a detailed schematic profile view of a rotating machine with installed rub pin in accordance with some embodiments of the present disclosure.
Figure 1C:
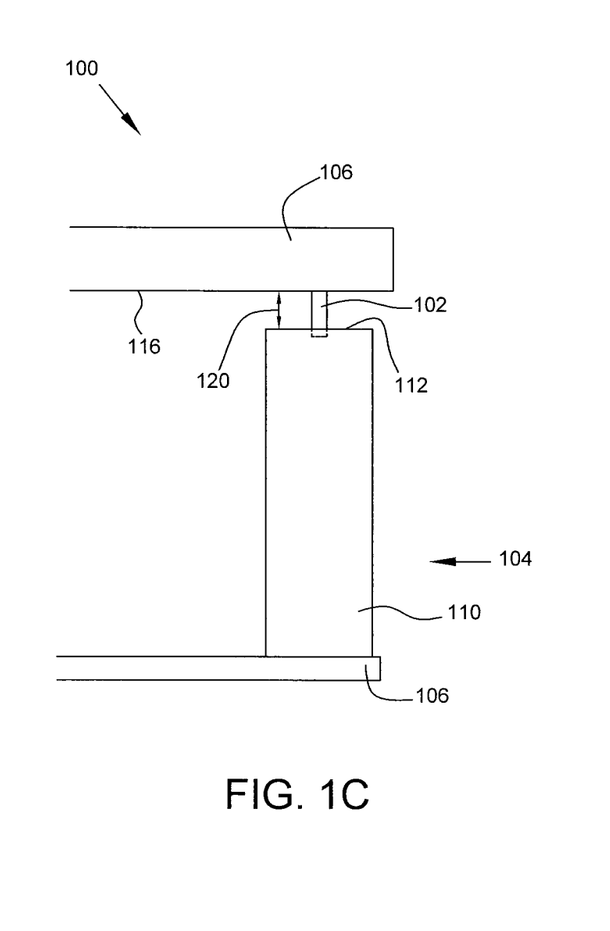
FIG. 1C is a side schematic cutaway view of a rotating machine with installed rub pin in accordance with some embodiments of the present disclosure.

FIG. 1B is a detailed schematic profile view of a rotating machine 100 with installed rub pin 102 in accordance with some embodiments of the present disclosure. FIG. 1C is a side schematic cutaway view of a rotating machine 100 with installed rub pin 102 in accordance with some embodiments of the present disclosure. As discussed above with reference to FIG. 1A, both FIGS. 1B and 1C illustrate a rub pin 102 affixed to radially inner surface 116 of static component 106 and extending toward the rotational flow path of rotating component 104. Clearance 120 is the distance between the tip 112 of blade 110 and the radially inner surface 116. Blade 110 is coupled to and rotates about shaft 108.

Figure 2:
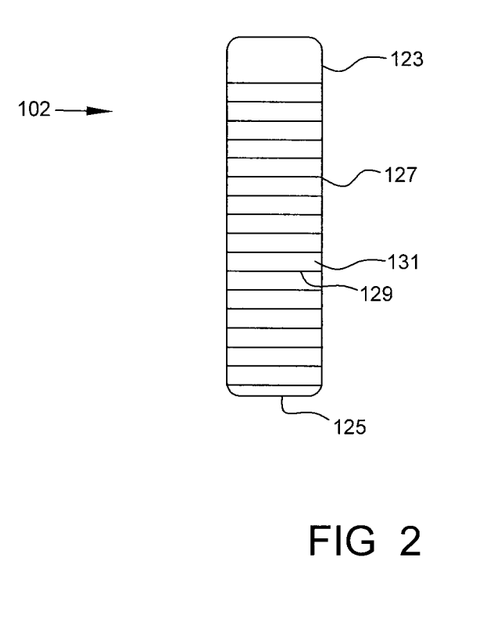
FIG. 2 is a side profile view of a rub pin in accordance with some embodiments of the present disclosure.

FIG. 2 is a side profile view of a rub pin 102 in accordance with some embodiments of the present disclosure. Rub pin 102 comprises a distal end 123, proximal end 125, and elongate portion 127 extending between distal end 123 and proximal end 125. Distal end 123 can also be referred to as the base of the rub pin 102. In some embodiments rub pin 102 is marked by a plurality of indicator lines 129, which divide rub pin 102 into a plurality of intervals 131. In some embodiments, indicator lines 129 are evenly spaced and intervals 131 are of equal size. An exemplary interval is approximately 0.002 inches.

Figure 5A:
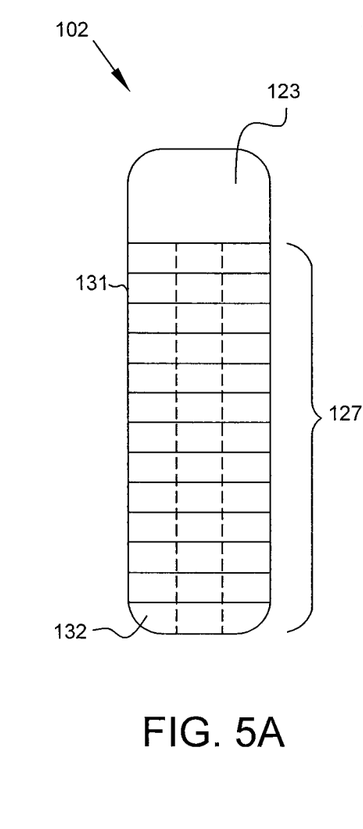
FIGS. 5A, 5B, and 5C are embodiments of a rub pin according with some embodiments of the present invention.
Figure 5B:
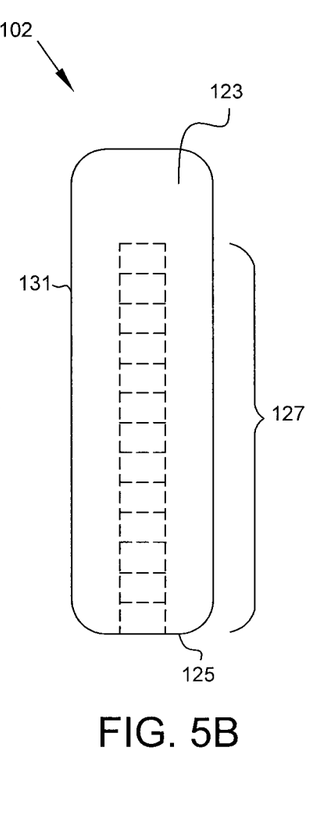
Figure 5C:
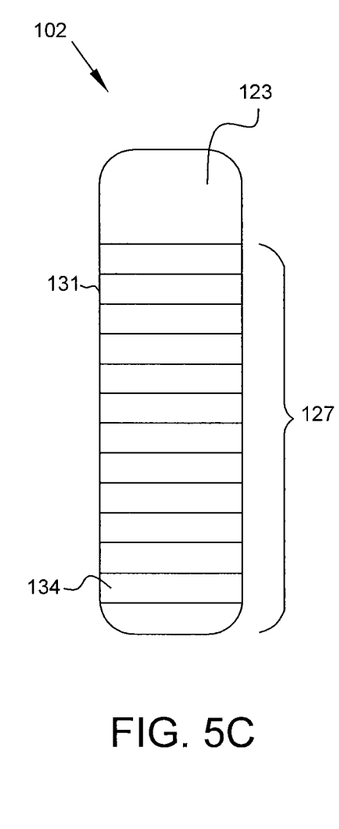

In some embodiments indicator lines 129 are etched or notched into rub pin 102. In some embodiments, indicator lines 129 and intervals 131 are colored to provide a high contrast, such as white intervals 131 and black indicator lines 129. In some embodiments intervals 131 alternate coloring to be more prominently visible. In some embodiments indicator lines 129 are marked with measurements, as measured from distal end 123. The rub pin 102 may be formed of brass with the intervals marked with engraving or notches as shown in FIG. 2 In the embodiments in which the intervals are indicated by color, the color may be applied as a coating, for example with paint, or may be from layers of an abradable core as shown in FIG. 5A, or external bands being made of differently colored material press fit onto a central rod as shown in FIG. 5B The rub pin 102 may also be constructed from multiple different materials that are visually distinguishable by color or texture as shown in FIG. 5C. Intervals 131 may alternate methods of visually distinguishing between adjacent intervals 131 for example by alternating interval 131 color, texture, notching, or a combination of these distinguishing characteristics. In some embodiments, an interval 131 has a distinguishing characteristic that is unique to that interval 131. In some embodiments visual indicators 129 and intervals 131 are arranged along a longitudinal axis of the rub pin 102. In some embodiments the color of an interval 131 is associated with a predetermined distance or length of rub pin 102.

In some embodiments indicator lines 129 do not extend completely from proximal end 125 to distal end 123; in some embodiments this indicates to a user the depth to which the rub pin 102 should be inserted into a bore or groove in static component 106.

As discussed above, at least one rub pin 102 but preferably a plurality of rub pins 102 are installed in a rotating machine 100 while the rotating component 104 is not rotating. In some embodiments, a rotating machine 100 must be at least partially disassembled or opened to provide access for installing rub pin 102. With rub pin(s) 102 installed, the rotating machine 100 is operated based on predetermined operational parameters. For example, in some embodiments it is desirable to measure clearance 120 for the rotating machine 100 operating at a standard operating pressure and temperature. The rotating machine 100 is therefore operated for a sufficient time to reach standard operating pressure and temperature, and can then be secured to obtain a reading of the rub pin 102.

In other embodiments it is desirable to measure clearance 120 for the rotating machine 100 during a specified transient, such as a rapid increase or decrease in power demand from the rotating machine 100. The rotating machine 100 is therefore operated to meet the operational parameters of the specified transient, and then is secured to obtain a reading of the rub pin 102.

Rub pins 102 provide effective and inexpensive means for measuring clearances 120 through a wide range of operating conditions and allow for a wide range of clearance testing to be performed.

Figure 3:
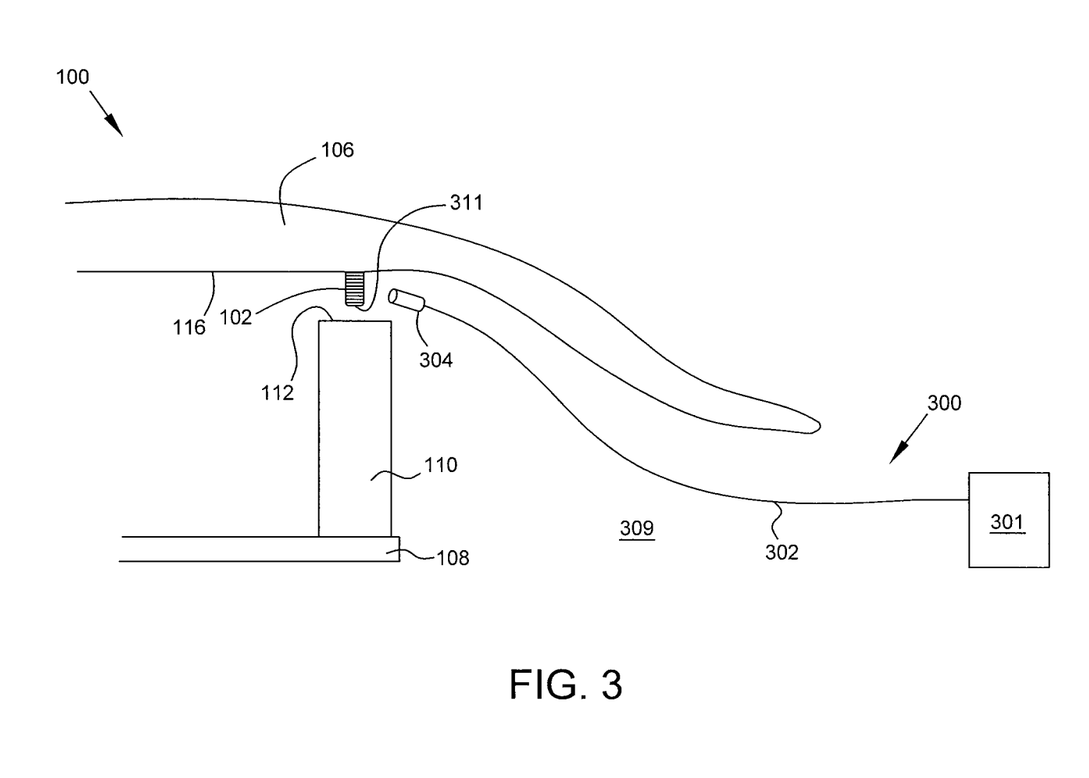
FIG. 3 is a side schematic cutaway view of a rotating machine with installed rub pin and an optical device partly disposed in the rotating machine in accordance with some embodiments of the present disclosure.

FIG. 3 is a side schematic cutaway view of a rotating machine 100 with installed rub pin 102 and an optical device 300 partly disposed in the rotating machine 100 in accordance with some embodiments of the present disclosure. Optical device 300 is used to ascertain the length of the rub pin 102 following operation of the rotating machine 100 likely to cause reduction in the rub pin 102 due to impingement of blade 110.

As shown in the illustration, optical device 300 is preferably inserted into rotating machine 100 through an inlet or exit of the machine, such as through an exhaust duct 309. Where optical device 300 is inserted through a normal flow path of the rotating machine 100 it is unnecessary to disassemble the rotating machine 100 to read the rub pin 102, thus saving time and cost when determining clearance. If the rub pin 102 cannot be read by inserting optical device 300 through an inlet or exit of rotating machine 100, it is preferable to insert optical device 300 using the least intrusive (i.e. requiring the least disassembly) manner possible. For example, optical device 300 may be inserted through a small access port rather than completing a teardown of rotating machine 100. These access ports are commonly provided in turbomachinary.

In the illustrated embodiment, optical device 300 comprises a work station 301, fiber optic cable 302, and optical element 304. Optical element 304 allows a user stationed at work station 301 to view rub pin 102 via a video connection. In some embodiment, optical element 304 is capable of taking still photographs of rub pin 102 or other components of rotating machine 100. In some embodiments optical device 300 is a boroscope.

Clearance 120 between a rotating component 104 and static component 106 is determined by counting the indicator lines 129 or intervals 131 between the radially-inner surface 116 of static component and a newly-formed terminus 311 of rub pin 102. Terminus 311 is formed by blade 110 impinging on rub pin 102, causing the removal of some portions of the rub pin 102. Terminus 311 is created due to the closest approach of the blade 110 to static component 106 and thus the minimal clearance 120 during the operation of the rotating machine 100. Once the number of indicator lines 129 or intervals 131 is visually ascertained, that number can be multiplied by the known length of the interval 131 to obtain a total length of the rub pin 102 and thus clearance 120. In embodiments where rub pin 102 is designed with non-uniform intervals, rub pin 102 is visually inspected to determine its length, either by reading markings on the rub pin 102 or by visually comparing the rub pin 102 to a template or copy.

Figure 4:
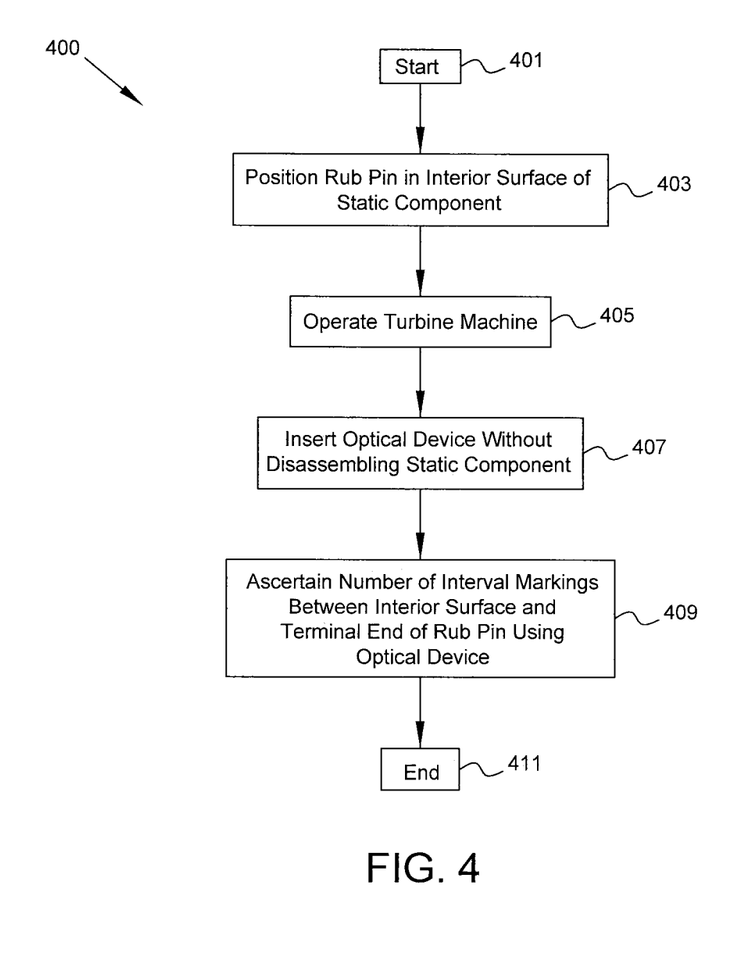
FIG. 4 is a block diagram of a method in accordance with some embodiments of the present disclosure.

FIG. 4 is a block diagram of a method 400 in accordance with some embodiments of the present disclosure. Method 400 starts at block 401, and proceeds to block 403 where a rub pin 102 is positioned in an interior surface of a static component 106 of the rotating machine 100. In some embodiments, the interior surface is radially inner surface 116. In other embodiments, the interior surface is any surface facing a rotating component and between which a clearance is desired to be obtained. In most rotating machines 100, at least some disassembly of the machine 100 will be required in order to have access to an interior surface of the static component 106 to position the rub pin 102 according to step 403. Rub pin 102 is positioned to have a proximal end 125 extending toward the rotational path (travel path 114) of the rotating component 110. In some embodiments, rub pin 102 is positioned such that the proximal end 125 extends into the rotational path of the rotating component 110.

After the rub pin 102 is positioned and the rotating machine 100 is re-assembled as required, the rotating machine 100 is operated at step 405. Operation of the rotating machine 100 during clearance testing can take many forms. In some embodiments, a steady-state clearance is desired and the rotating machine 100 is operated at steady-state conditions (i.e. various machine parameters are within their normal operating bands) for a set period of time. In some embodiments, clearance measurements are desired for various machine transients such as power fluctuations. A testing regimen for this period of operation may require taking the rotating machine 100 through a series of different transients or through multiples of a single type of transient in order to obtain a clearance measurement. As one example, at step 405 the rotating machine 100 can be operated in a cold burst, which for many machines such as turbine engines is the transient which causes the largest clearance closure (i.e. the smallest clearance between rotating component 104 and static component 106). A cold burst test in most machines will provide a measurement of the minimum anticipated clearance for that machine.

After the rotating machine 100 is operated and secured, at step 407 an optical device 300 is inserted into the rotating machine 100 without disassembling the static component 106. Optical device 300 is preferably inserted into rotating machine 100 through an inlet or exit of the machine, such as through a working fluid intake duct or an exhaust duct 309 as illustrated in FIG. 3. Where optical device 300 is inserted through a normal flow path of the rotating machine 100 it is unnecessary to disassemble the rotating machine 100 to read the rub pin 102, thus saving time and cost when determining clearance. If the rub pin 102 cannot be read by inserting optical device 300 through an inlet or exit of rotating machine 100, it is preferable to insert optical device 300 using the least instrusive (i.e. requiring the least disassembly) manner possible. For example, optical device 300 may be inserted through a small access port rather than completing a teardown of rotating machine 100. This minimally intrusive inspection also saves time and cost over the prior art.

At step 409 optical device 300 is used to visually ascertain a characteristic of the rub pin 102. For example, optical device 300 may be used to visually ascertain a number of indicator lines 129 or intervals 131 between the interior surface (i.e. radially inner surface 116) of the static component 116 and a terminus 311 or terminal end of rub pin 102. Terminus 311 is formed by blade 110 impinging on rub pin 102, causing the removal of some portions of the rub pin 102. Terminus 311 is created due to the closest approach of blade 110 to static component 116 and thus the minimal clearance 120 during the operation of the rotating machine 100. In Step 409, the interval indicator line or color may be determinative of the minimal clearance 120. In some embodiments, the characteristic of the rub pin 102 which is visually ascertained at step 409 is one of color, texture, text, or material.

A user operates the optical device 300 to visually ascertain a characteristic of the rub pin 102 which is used to determine the clearance. For example, the optical device 300 may be used to visually ascertain the number of indicator lines 129 or intervals 131 on rub pin 102. Once the number of indicator lines 129 or intervals 131 is visually ascertained, that number can be multiplied by the known length of the interval 131 to obtain a total length of the rub pin 102 and thus clearance 120. In embodiments where rub pin 102 is designed with non-uniform intervals, rub pin 102 is visually inspected to determine its length, either by reading markings on the rub pin 102 or by visually comparing the rub pin 102 to a template or copy.

Method 400 ends at step 411.

The present disclosure provides many advantages over previous systems and methods of measuring clearances between rotating and static components. Knowing the clearance measurement in rotating machinery can be critical to determining how well the machine is performing and can indicate ways to improve performance, particularly for rotating blades in turbine engines. The present disclosure provides a system and method of measuring clearances that avoids the complexity of previous systems such as multi-tip capacitance sensors, microwave sensors, and eddy current transducers. The present disclosure additionally provides for a faster, less labor-intensive method of measuring clearances than the traditional use of rub pins. The method of the present disclosure avoids the need for multiple, sequential teardowns or disassemblies of a rotating machine.

Although examples are illustrated and described herein, embodiments are nevertheless not limited to the details shown, since various modifications and structural changes may be made therein by those of ordinary skill within the scope and range of equivalents of the claims.

What is claimed is:

1. In a gas turbine engine comprising a compressor, a combustor, and a turbine, the gas turbine engine having a rotatable component and a static component, a method of measuring clearance between the rotatable component and the static component without twice disassembling the static component, the method comprising:

disassembling, at least partly, the static component to position at least one rub pin in the static component, wherein the at least one rub pin has interval markings and is disposed having a proximal end of the rub pin extending toward the rotational path of the rotatable component;

operating the gas turbine engine at a predetermined at least one steady-state engine operating parameter, the at least one steady-state engine operating parameter selected from a list comprising steady-state operating pressure, steady-state operating temperature, or steady-state operating power output, said operating causing the rotatable component to remove a portion of the rub pin;

inserting an optical device into the static component without disassembly; and visually ascertaining, via the optical device, the number of interval markings between an interior surface of the static component and a terminal end of the rub pin formed by the removal of the a portion of the rub pin in the rotational path of the rotatable component;

wherein the interval markings comprise a coating over an elongated portion of the rub pin.

2. The method of claim 1 wherein the clearance is determined for steady-state engine operating parameters temperature, pressure, rotational speed of the rotatable component, or output of the gas turbine engine.

3. The method of claim 1 wherein the step of operating the gas turbine engine comprises drawing air through the compressor, mixing the air with fuel, igniting the air-fuel mixture, and exhausting the combustion gasses through the turbine.

4. The method of claim 3 wherein the rotatable component is a bladed rotor.

5. The method of claim 4 wherein the static component is a shroud.

6. The method of claim 5 wherein one of the compressor and the turbine comprise the bladed rotor.

7. A method of determining the clearance between a blade and shroud of a gas turbine engine, the gas turbine engine comprising a compressor, a combustor, and a turbine, the method comprising operating the gas turbine engine at a predetermined at least one steady-state engine operating parameter, the at least one steady-state engine operating parameter selected from a list comprising steady-state operating pressure, steady-state operating temperature, or steady-state operating power output, said operating causing the rotatable component to remove a portion of an optical rub pin;

inserting an optical device through a port in the gas turbine engine;

visually ascertaining, via observing with the optical device, a characteristic of one or more of a plurality of visual indicators on the optical rub pin, wherein the plurality of visual indicators are bands surrounding a central rod, wherein the optical rub pin comprises:

a base adapted to be received and affixed to an interior of the shroud;

an elongated portion extending from the base and adapted to project radially inward from the shroud, wherein the plurality of visual indicators comprise at least a portion of the elongated portion;

determining the clearance based on the ascertained characteristic on a terminus of the optical rub pin.

8. The method of claim 7, wherein the characteristic is selected from the group consisting of color, texture, contour and text.

9. The method of claim 8, wherein the characteristic alternates between adjacent visual indicators.

10. The method of claim 9, wherein the plurality of visual indicators define a plurality of intervals.

11. The method of claim 10, wherein the plurality of visual indicators are notches or engravings defining the predetermined intervals.

12. The method of claim 11, wherein the predetermined intervals are constant.

13. The method of claim 12, wherein the predetermined intervals are approximately 0.002 inches.

14. The method of claim 8, wherein the color of each of the plurality of visual indicators is associated with a predetermined distance.

15. The method of claim 7, wherein the plurality of visual indicators are a core within a bore in the elongated portion.

16. The method of claim 7, wherein the plurality of visual indicators are arranged sequentially along a longitudinal axis of the elongated portion.

17. A method of determining the clearance between a blade and shroud of a gas turbine engine, the gas turbine engine comprising a compressor, a combustor, and a turbine, the method comprising operating the gas turbine engine at a predetermined at least one steady-state engine operating parameter, the at least one steady-state engine operating parameter selected from a list comprising steady-state operating pressure, steady-state operating temperature, or steady-state operating power output, said operating causing the rotatable component to remove a portion of an optical rub pin;

inserting an optical device through a port in the gas turbine engine;

visually ascertaining, via observing with the optical device, a characteristic of one or more of a plurality of visual indicators on the optical rub pin, wherein the optical rub pin comprises:

a base adapted to be received and affixed to an interior of the shroud; an elongated portion extending from the base and adapted to project radially inward from the shroud, wherein the plurality of visual indicators comprise at least a portion of the elongated portion;

determining the clearance based on the ascertained characteristic on a terminus of the optical rub pin;

wherein the plurality of visual indicators comprise a coating over the elongated portion.

18. In a gas turbine engine comprising a compressor, a combustor, and a turbine, the gas turbine engine having a rotatable component and a static component, a method of measuring clearance between the rotatable component and the static component without twice disassembling the static component, the method comprising:

disassembling, at least partly, the static component to position at least one rub pin in the static component, wherein the at least one rub pin has interval markings and is disposed having a proximal end of the rub pin extending toward the rotational path of the rotatable component;

operating the gas turbine engine at a predetermined at least one steady-state engine operating parameter, the at least one steady-state engine operating parameter selected from a list comprising steady-state operating pressure, steady-state operating temperature, or steady-state operating power output, said operating causing the rotatable component to remove a portion of the rub pin;

inserting an optical device into the static component without disassembly; and visually ascertaining, via the optical device, the number of interval markings between an interior surface of the static component and a terminal end of the rub pin formed by the removal of the a portion of the rub pin in the rotational path of the rotatable component;

wherein the plurality of visual indicators are bands surrounding a central rod.

* * * * *